Nov. 2, 1965  C. W. ELLINGSON, JR., ETAL  3,214,879
GLASS EDGING
Filed Aug. 29, 1963  2 Sheets-Sheet 1
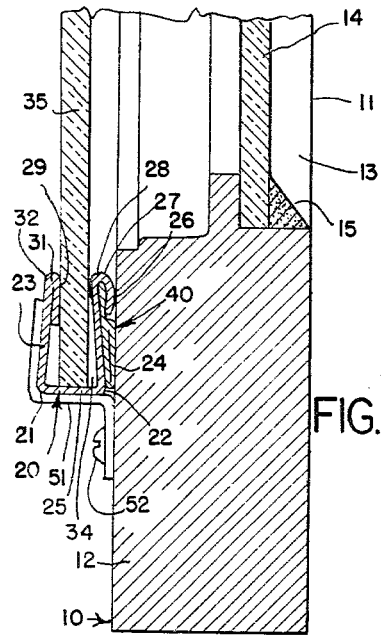
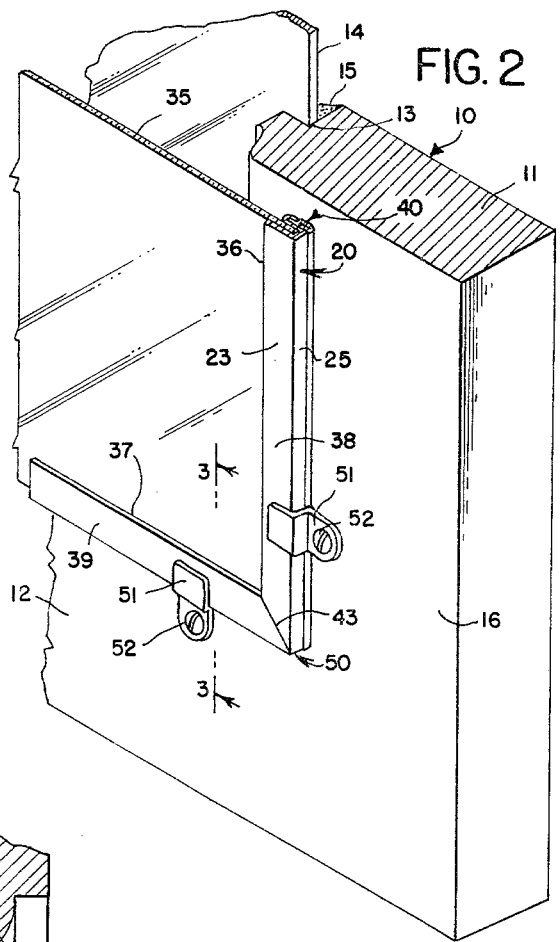
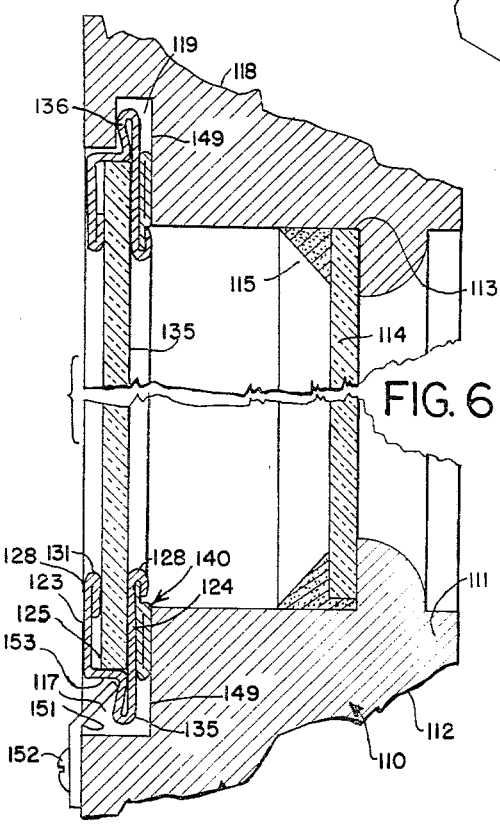
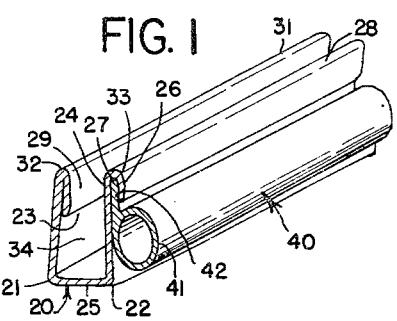
INVENTORS
CHESTER W. ELLINGSON JR.
WILLIAM E. LIGENFELDER
BY
Caswell Lagaard & Wicks
ATTORNEYS Nov. 2, 1965   C. W. ELLINGSON, JR., ETAL   3,214,879
GLASS EDGING Filed Aug. 29, 1963   2 Sheets-Sheet 2

INVENTORS
CHESTER W. ELLINGSON JR.
WILLIAM E. LINGENFELDER
BY
Caswell Lagaard & Wicks
ATTORNEYS United States Patent Office 3,214,879
Patented Nov. 2, 1965

3,214,879
GLASS EDGING
Chester W. Ellingson, Jr., Rosemount, and William E. Lingenfelder, Hastings, Minn., assignors to Reese Metal Weatherstrip Company, Rosemount, Minn., a corporation of Minnesota
Filed Aug. 29, 1963, Ser. No. 305,434
5 Claims. (Cl. 52—720)

The herein disclosed invention relates to a glass edging for application to the marginal portions of a pane of glass and has for an object to provide an edging adapted to form a frame encircling the pane of glass for supporting the glass and for protecting the edges thereof.

Another object of the invention resides in providing an edging having a channel carrying a gasket which is compressible in a direction toward the glass whereby the glass may be applied to a window frame or sash to provide double glazing for the window.

A still further object of the invention resides in firmly attaching the gasket to the channel to facilitate forming the frame and attaching the pane to the window frame or sash.

An object of the invention resides in providing a gasket having a great amount of flexibility whereby tight contact may be made with a rough or irregular surface.

Another object of the invention resides in constructing the gasket with a body tubular in form and with a fin extending outwardly therefrom.

A still further object of the invention resides in disposing the fin in tangential relation with respect to the body so that the fin and body may lie flat against the outer surface of the leg of the channel on which the gasket is mounted.

An object of the invention resides in providing the channel with a flange overlying the outer surface on which the gasket is disposed and providing a slit therebetween in which the fin is disposed.

Another object of the invention resides in constructing the channel from a strip of sheet metal and bending the legs and flange from said strip by running the strip through rollers.

A still further object of the invention resides in constructing the other leg of the channel with a marginal portion bent back upon itself and into the groove of the channel to form a bead at the outer edge of said leg having rounded corners.

An object of the invention resides in providing a bend between the flange and the leg from which it issues to form a similar construction.

Other objects of the invention reside in the novel construction an darrangement of parts and in the details of construction hereinafter illustrated and/or described.

In the drawings:

FIG. 1 is a fragmentary perspective view of a piece of glass edging embodying the instant invention and drawn to an enlarged scale.

FIG. 2 is a perspective view showing a portion of the edging formed into a frame receiving a pane of glass and the pane of glass applied to a window sash to provide double glazing.

FIG. 3 is a fragmentary cross-sectional view taken on line 3—3 of FIG. 2.

FIG. 6 is a fragmentary elevational sectional view taken on line 6—6 of FIG. 5.

Figure 5:
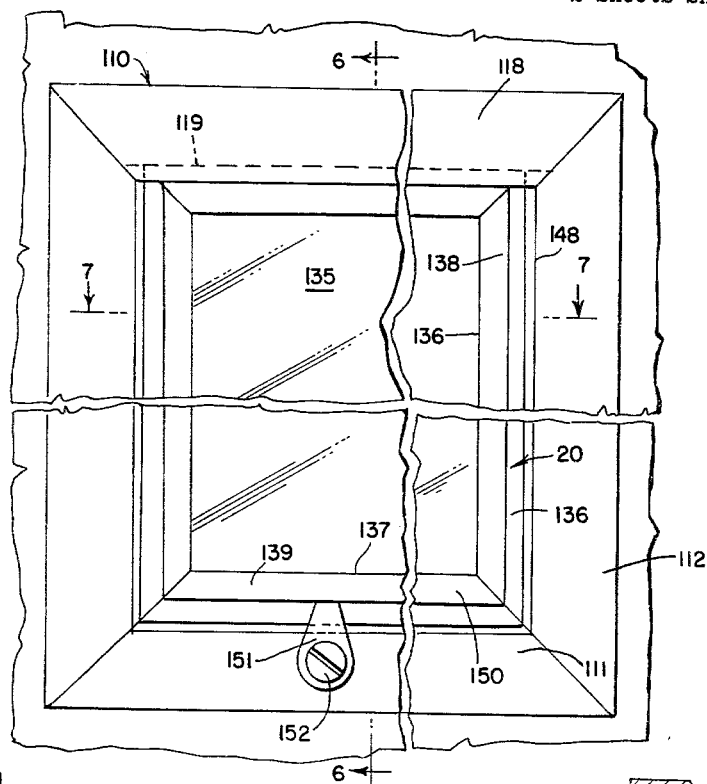
FIG. 5 is an elevational view of a window sash illustrating the form of the invention shown in FIG. 4 applied thereto.

For the purpose of explaining the invention a portion of a sash 10 has been shown which includes a stile 11 and a rail 12. The real and stile are attached to each other in the customary manner. The said rail and stile are formed with a rabbet 13 which extends completely around the sash and in which is received the usual window pane 14. This pane is sealed by means of putty 15.

In the colder climates it becomes highly desirable to double glaze the windows and where storm sashes are not employed glazing may be applied with the instant invention directly to the sash or to the window frame to take the place of the ordinary storm sash. The instant invention utilizes a glass edging which is attached to a pane of glass and by means of which the glass may be mounted on the window sash.

The edging constituting the instant invention consists of a channel 20 constructed of metal and which extends about the edges of the glass. This channel has mounted on it a gasket 40 which is adapted to fit against the surface of the rails and stiles of the sash to make a weather-tight joint therebetween.

The channel 20 is constructed from sheet metal in strip form which is formed with bends 21 and 22 forming two spaced legs 23 and 24 with a back 25 connecting the same. By means of this construction, a groove 34 is formed in the channel which is of proper dimensions to snugly receive a pane of glass such as indicated at 35 in FIG. 2. The outer edge of the leg 24 has a flange 26 which extends along the outer surface of said leg and is spaced therefrom to form a slit 27 between said flange and leg. A reverse bend 28 connects the flange 26 with the outer edge of the leg 24. The marginal portion 29 of the leg 23 is folded back upon itself as shown in FIG. 1 to form a bead 31 having a rounded edge 32. In a similar manner the bend 28 is constructed with a rounded edge 33 disposed opposite the bead 31. The portion 29 is disposed within the groove 34 formed in the channel 20 and lies close to and along the leg 23.

The gasket 40 is constructed of some readily flexible material such as vinyl and is formed with a tubular body 41. Issuing from this body is a fin 42 which is tangent to the body 41. This fin is adapted to be received in the slit 27 and when the flange 26 is crowded against the leg 24 the said fin is clamped in position and the gasket securely held attached to the channel.

In utilizing the invention, sections 38 and 39 of the edging are applied to the edges 36 and 37 of the pane 35 as shown in FIG. 2 and the joints as indicated at 43 are mitered to form a composite frame indicated by the reference numeral 50.

In the application of the pane 35 and frame 50 to the sash 10 said frame is positioned with the gasket 40 facing the surface 16 of said sash and pressed against the same. Offset clips 51 are then applied to the frame and secured to the sash by means of screws 52. These clips are of such size that when the screws 52 are tightened down the body 41 of gasket 42 is flattened and caused to fit tightly against the surface 16 of the sash. The said body being tubular is caused to follow irregularities in the surface 16 and to form a weather-tight joint therebetween.

The advantages of the invention are manifest. The edging can be constructed by running the strip of metal through suitable rolls which bend and form the metal into the desired shape. As the parts are formed, the fin of the gasket is inserted into the slit between the flange 26 and the leg 24 of the channel and when the said flange and leg are squeezed together the gasket is securely held attached to the channel. The invention utilizing a gasket with a tubular body will readily fit against irregular surfaces and produce a weather-tight seal between the gasket and the window pane. The gasket being firmly attached to the channel, miter joints can be formed in the edging by sawing through the gasket and channel and bringing the parts together. The edging consists of a minimum amount of material and can be constructed at a minimum expense. The application of a window pane equipped with a frame embodying the invention to a sash is extremely simple and can be performed without special tools or equipment. While the invention has been shown as applied to the inner surface of the sash it can be readily comprehended that a rabbet may be cut in the sash frame and the pane and frame therefor inserted in such rabbet.

Figure 4:
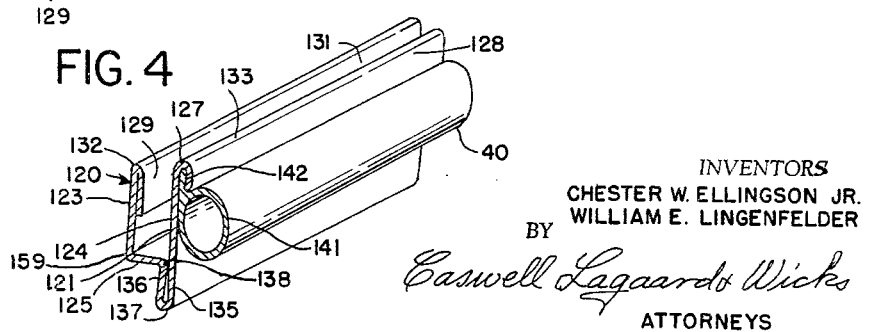
FIG. 4 is a view similar to FIG. 1 of a modification of the invention.

In FIG. 4 we have shown a modification of the invention. This form of the invention is similar to that previously described and the description of the similar parts will not be repeated. Also, the same numerals preceded by the digit 1 will be used to describe corresponding parts. This form of the invention differs only from that shown in FIG. 1 in that a lip 136 is provided which lies in continuation of the leg 124 of channel 120. This lip is formed by making a return bend 137 in the metal, which is connected to the back 125 by means of a bend 138 and to the leg 124 by means of a bend 159.

Figure 7:
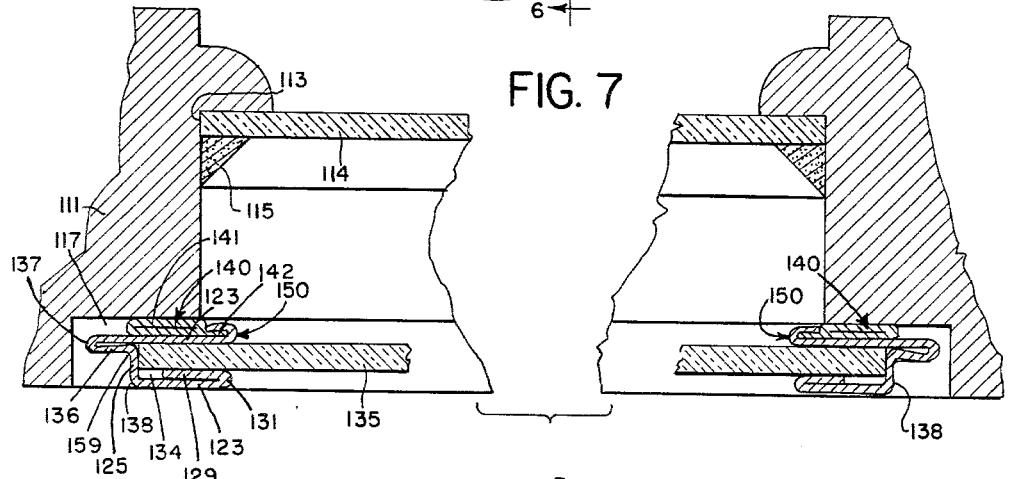
FIG. 7 is a fragmentary plan sectional view taken on line 7—7 of FIG. 5.

Installing this form of the invention on a window sash 110 such as shown in FIGS. 5, 6 and 7, a rabbet 117 is cut in the sash rails and stiles 111 and 112 and extending completely about the opening in the sash. At the upper rail 118 of the sash a groove 119 is cut which communicates with the rabbet 117. This construction provides a flat face 149 which is planiform. The opening 148 formed by the rabbet 117 is of a width to receive the frame 150 with the lips 136 lying in said rabbet. The lower channel of frame 150 is similarly disposed in said rabbet while the lip 136 is received in groove 119. This lip and groove form a hinge construction by means of which the frame 150 and pane 135 may be swung out of the rabbet 117 in sash 110. The frame and sash may be held in position by means of one or more clips 151 which engage the reentrant angle 153 formed between the back 125 and the lip 136. This clip is attached to the sash by means of a screw 152. When the frame 150 and pane 135 are in position gasket 140 is compressed and fits tightly against the face 149 of the rabbet 117.

Changes in the specific form of the invention, as herein described, may be made within the scope of what is claimed without departing from the spirit of the invention.

Having described the invention, what is claimed as new and desired to be protected by Letters Patents is:

1. A glass edging comprising:
   (o) a channel having spaced planiform legs and a planiform back connected to said legs at one end of each thereof to form an elongated groove for the reception of the marginal part of a pane of glass,
   (p) an elongated flexible gasket overlying the outer surface of one of said legs of said channel and having a body compressible in a direction toward said legs,
   (q) said body being tubular in form with the outer surface thereof being substantially cylindrical,
   (r) a longitudinal fin on said body tangent thereto and extending outwardly from said body on one side thereof,
   (s) the combined width of said fin and body being less than the width of said leg,
   (t) said fin being disposed at the outer portion of said leg,
   (u) a flange issuing from the outer edge of said leg and overlying said fin and facing the outer surface of said leg,
   (v) said flange extending toward said body and being urged toward said leg to hold the gasket firmly attached to said channel.

2. A glass edging comprising:
   (j) a channel constructed of sheet metal and bent to form spaced legs and a back connected thereto, thereby providing a groove for the reception of the marginal portion of a pane of glass,
   (w) one of said legs extending outwardly beyond said back and being bent back upon itself and connected to said back to form a lip extending outwardly beyond said back,
   (b) an elongated flexible gasket overlying one of the legs of said channel and having a body compressible in a direction toward said leg,
   (i) said fin overlying the leg of said channel on which the gasket is disposed, and being disposed at the outer portion of said leg,
   (k) a flange issuing from the outer edge of the leg of said channel on which said gasket is disposed and extending along and spaced from said leg to form a slit therebetween for the reception of said fin,
   (l) said flange being urged against said fin to hold said gasket attached to said body.

3. A glass edging comprising,
   (a) a channel having spaced legs and a back connected thereto and forming a groove for the reception of the marginal portion of a pane of glass,
   (b) an elongated flexible gasket overlying one of the legs of said channel and having a body compressible in a direction toward said leg,
   (e) said body being tubular in form,
   (c) a longitudinally extending fin on said body,
   (f) said fin being tangential to said body,
   (i) said fin overlying the leg of said channel on which the gasket is disposed,
   (g) a flange on the leg of said channel on which the gasket is disposed overlying said leg and spaced therefrom to form a slit therebetween for the reception of said fin,
   (h) said flange engaging said fin and holding said gasket attached to said flange.

4. A glass edging comprising,
   (j) a channel constructed of sheet metal and bent to form spaced legs and a back connected thereto, thereby providing a groove for the reception of the marginal portion of a pane of glass,
   (b) an elongated flexible gasket overlying one of the legs of said channel and having a body compressible in a direction toward said leg,
   (x) said body being disposed at the portion of said leg adjacent said back,
   (c) a longitudinally extending fin on said body,
   (i) said fin overlying the leg of said channel on which the gasket is disposed, and being disposed to the outer portion of said leg,
   (k) a flange issuing from the outer edge of the leg of said channel on which said gasket is disposed and extending along and spaced from said leg to form a slit therebetween for the reception of said fin,
   (l) said flange being urged against said fin to hold said gasket attached to said flange.

5. A glass edging comprising,
   (j) a channel constructed of sheet metal and bent to form spaced legs and a back connected thereto, thereby providing a groove for the reception of the marginal portion of a pane of glass,
   (b) an elongated flexible gasket overlying one of the legs of said channel and having a body compressible in a direction toward said leg,
   (c) a longitudinally extending fin on said body,
   (k) a flange issuing from the outer edge of the leg of said channel on which said gasket is disposed and extending along and spaced from said leg to form a slit therebetween for the reception of said fin,
   (l) said flange being urged against said fin to hold said gasket attached to said channel,
   (m) the outer marginal portion of the other leg of said channel being bent back upon itself and into said groove to form a bead with an outwardly facing curved edge, and (n) a return bend between said first named leg and the flange issuing therefrom to form an outwardly facing curved edge conforming to and disposed opposite the curved edge of said bead.

References Cited by the Examiner

UNITED STATES PATENTS

| | | | |
|---|---|---|---|
| 1,671,349 | 5/28 | Crist | 20—69 |
| 2,266,973 | 12/41 | Horton | 20—56.5 |
| 2,631,340 | 3/53 | Becker | 20—55 |
| 2,637,422 | 5/53 | Bell | 20—55 X |
| 2,767,814 | 10/56 | Johnson | 20—55 |
| 2,923,982 | 2/60 | Burkland | 20—55 |

HARRISON R. MOSELEY, *Primary Examiner.*